June 5, 1956
L. E. STERNS
2,748,598
PORTABLE LEAK TESTER
Filed July 1, 1954
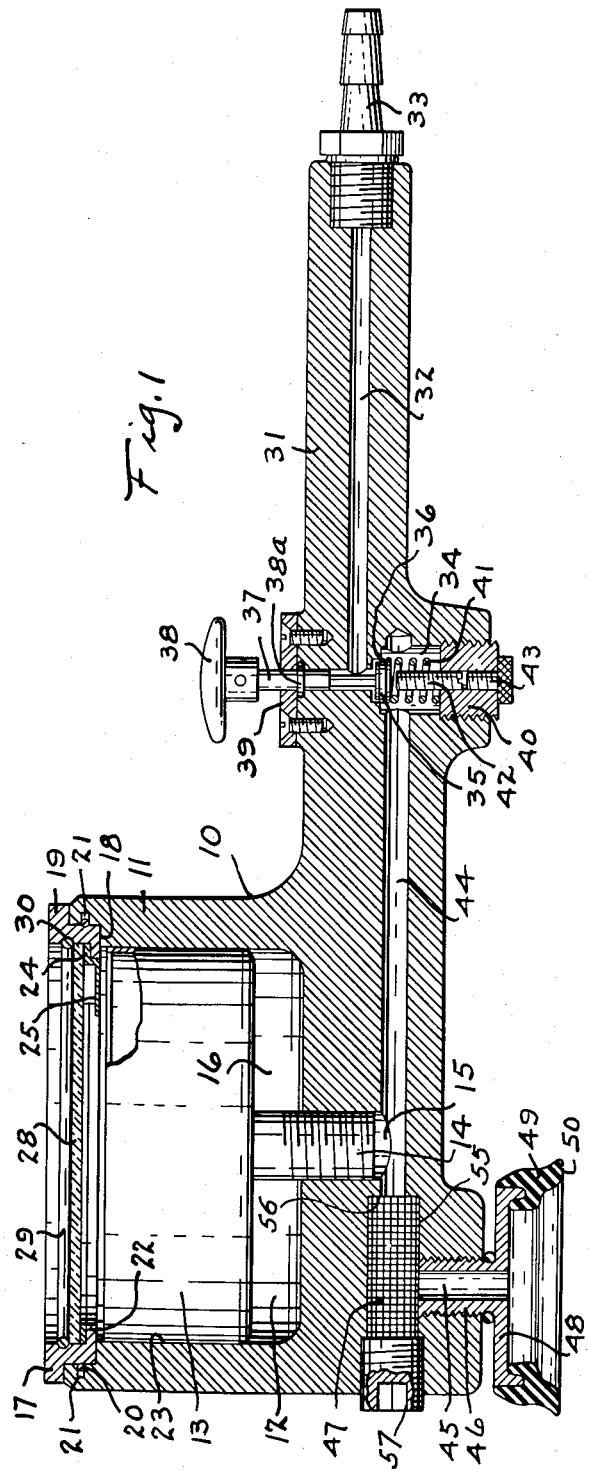
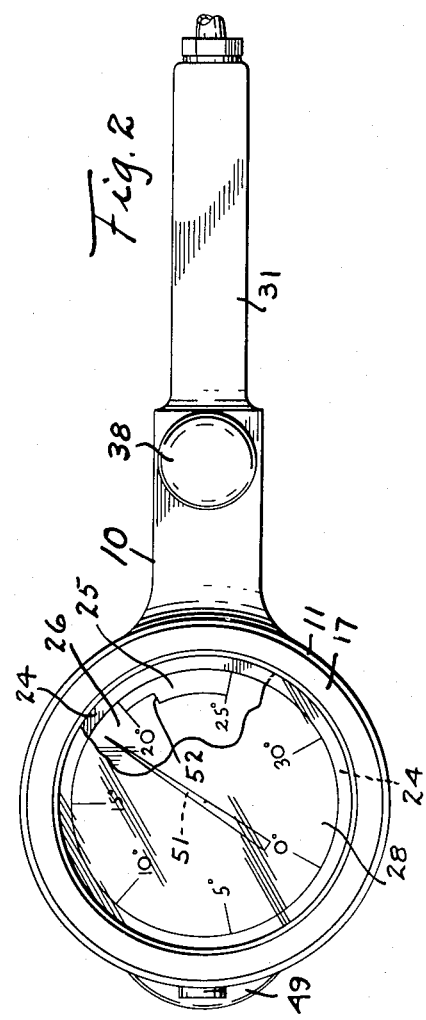
INVENTOR
LORANCE E. STERNS,
By Herbert A. Minturn,
ATTORNEY

United States Patent Office 2,748,598
Patented June 5, 1956

2,748,598

PORTABLE LEAK TESTER

Lorance E. Sterns, Indianapolis, Ind., assignor to Whittington Pump & Engineering Corporation, Indianapolis, Ind., a corporation of Indiana Application July 1, 1954, Serial No. 440,739

1 Claim. (Cl. 73—40)

This invention relates to a device which may be carried in the hand of an operator and applied to various objects such as, for one example, an engine block wherein the leakage past a valve and its seat may be determined, and also whether or not there may be leaks through the walls of castings. The invention includes the use of a vacuum or at least a partial vacuum in a head carrying a gauge and a device for sealing off an area within which a leak is to be detected so that any leakage will be indicated by a change in the needle on the dial of the gauge.

A primary object of the invention is to provide a lightweight structure to which may be attached a hose leading from any suitable evacuating means, and the device manipulated by merely pressing it against the surface to include the area over which the test is to be made.

A further primary object of the invention is to provide a device for indicating the degree of leakage. Also included in the objects of the invention is the provision of a device of the nature indicated which may be produced at a relatively low cost whereby it may be universally used.

These and many other objects and advantages of the invention will become apparent to those versed in the art in the following description of one particular form of the invention as illustrated in the accompanying drawing, in which Fig. 1 is a view in central vertical section of a structure embodying the invention; and Fig. 2 is a view in top plan of the device on a reduced scale.

A body generally designated by the numeral 10 is formed preferably in one piece, and has a head 11 within which there is a well 12 cylindrical in nature. Within this well 12 there is received a gauge 13 of that type which will measure sub-atmospheric pressures. The gauge in the form herein shown carries a nipple 14 which is screwthreaded into a vertical bore 15. A space 16 is left between the bottom of the gauge 13 and the bottom of the well 12 in order to insure clearance between the gauge and the bottom whereby the upper side of the gauge may be located below the extreme top side of the head 11. A ring 17 is revolubly mounted in the top end of the body 11 to slidingly rest on a shoulder 18 therearound. The ring 17 has a shoulder 19 extending annularly therearound and extending outwardly over the top side of the body 11, Fig. 1.

The ring 17 is revolubly retained within the top end of the body 11 by any suitable means, herein shown by a spring wire 20 encircling the ring 17 above the shoulder 18 and below the top of the body 11, elastically gripping the ring and also fitting in a groove 21.

The ring 17 is provided with a flange 22 extending annularly therearound and inwardly from the inner face 23 of the well 12. On this flange 22 there is fixed a ring 24 which has an inward extension 25 to be positioned over the dial 26 of the gauge 13. Then over the ring 24 there is positioned a glass 28 which is held down compressibly against the ring 24 by means of a spring snapring 29 entering a groove 30 around the ring.

By gripping the outer peripheral edge of the ring 17, it may be revolved and carry the extension 25 around circumferentially over the dial 26. The use of this extension 25 will become more apparent in the description of the operation of the device as set out below.

The body 10 has an extension 31 to one side of the head 11, of an external shape which is conveniently gripped by the operator. This extension 31 has a bore 32 extending longitudinally from an outer end in connection with a hose connection nipple 33. The bore 32 terminates by its inner ends in a vertical bore 34 which communicates with a larger bore 34 therebelow. A valve 35 is entered through the bore 34 to seat against the shoulder 36 as a means of cutting off flow between the bore 34 and the bore 32. The valve 35 is fixed on the lower end of a stem 37 which is carried upwardly and outwardly from from the extension 31 to have an operating button 38 on its uppermost end. This stem 37 is sealed off against leakage therearound by any suitable means such as by the gasket 38a retained by the plate 39. A screwthreaded plug 40 enters the bore 34 from the under side to carry a compression spring 41 between it and the under side of the valve 35 so that the valve 35 is normally urged to a closed position. The degree of opening of the valve 35 is controlled by means of a screwthreaded stud 42 entered up through the plug 40, access to which stud 42 may be had by removing the screw 43. The purpose of the stud 42 is to control the degree of travel of the stem 37 under the operation of the button 38.

From the bore 34, there leads a bore 44 longitudinally from the bore and under the head 11 to be in communication with the vertical bore 15, and also to be in communication with the bore 45 which extends vertically through the nipple 46 which is screwthreadedly entered from the under side of the body 10.

A filtering screen 47 is carried between the bore 45 and the bore 44 in order to eliminate as much as possible any foreign matter entering through the bore 45 and into the bore 44.

A counterbore 55 enters the lower portion of the head 11 coaxially with the bore 44 to terminate inwardly of the head by a shoulder at a zone intermediate the bores 15 and 45. The screen 47 fits with a sliding fit in the counterbore 55 to abut by inner end the shoulder 56 and to extend therefrom across the bore 45, and have its outer end abutted by a plug 37 screwthreadedly entering the counterbore 55 to force the screen 47 snugly against the shoulder 56. The plug 57 by its inner end seals off the screen 47. The screen 47 as indicated in the drawing, Fig. 1, is cylindrical in shape. Obviously the plug 57 seals off the longitudinal passageway 44 at the outer end of the counterbore which receives both the screen 47 and the plug 57.

The nipple 46 is an extension from a head 48 which carries a flexible, elastic annular member 49 in the nature of a "vacuum cup." The member 49 is made out of a rubbery material so that by pressing the device downwardly against a surface, a seal may be formed around the lower annular edge portion 50.

In operation, the device is interconnected with any suitable source of a vacuum, not herein shown. The member 10 is carried to the object which is to be tested for leaks, and the member 49 in the nature of a cup is pressed down over the area of that object which is to be tested for leaks, the member 10 of its own weight being normally sufficient to effect the seal around the edge 50 and the object. Normally the surface of the object is planar so that a good seal will be had. Then the button 38 is depressed to evacuate the inside of the cup 49, the bore 46, the bore 44, and the bore 15 to cause the gauge 13 to register the maximum degree of vacuum by the rotation of the needle 51 all in the usual and well known manner. The ring 17 is revolved around to have the member 25 approach and register at the amount of pressure indicated by the needle under that degree of vacuum. Then the button 38 is released so that the bores 44, 15, 45, and the cup 49 are removed from further effect of the evacuating source on the other side of the valve 35. The circumferential length of the member 25 is made to be that which will be traversed by the needle 51 through the range of pressures permissible for a "no-leak" or a permissible leak through the object being checked. Should the needle travel on past the end of the member 25 as is shown in Fig. 2, then the leak is beyond that which is permissible. Thus, for different degrees of tolerances in this matter of leakage, the circumferential length of the member 25 may be varied. As indicated in Fig. 2, there may be a line or a shoulder 52 to indicate when the needle is approaching the limit of tolerance. In the example shown and described, it is assumed that the cup 49 will be evacuated to 25 inches of mercury (below atmosphere) since that is the position for the member 25, and the needle 51 will travel therefrom toward the 20 inches mercury indication. This 20 inches of mercury indication in the example is the lower limit. Anything between the range of 25 and 20 inches of mercury would be passable in the present instance.

There is a second operation possible. The foregoing operation requires an element of time to check the rate of leak by travel of the needle 51 away from the upper vacuum reading. This second operation consists of adjusting the permissible opening of the valve 35 by the screw 43, and holding the valve 35 open, whereupon the pressure at the cup 50 is compared by the gauge needle 51 position to the pressure in the system to the right of the valve 35. Then the gauge needle 51 will remain at a relatively fixed position for an acceptable leak rate as predetermined by the setting of the permissible opening of the valve 35.

Therefore, it is to be seen that I have provided a very simple yet most effective device for checking leaks over small areas, and such a device which may be carried to the work rather than having to bring the work to the device. Therefore, while I have herein shown and described my invention in the one particular form, it is obvious that structural changes may be made without departing from the spirit of the invention, and I therefore do not desire to be limited to that precise form beyond the limitations which may be imposed by the following claim.

I claim:

A manufacture consisting of a portable hand carried structure for testing location and degree of leaks in castings and the like, comprising a head having a cylindrical well; an elongated handle extended to an outer free end for connection with a source of sub-atmospheric vacuum, said handle extending from said head diametrically of and from the underside of said well, said handle having a passageway extending longitudinally from end to end thereof, said passageway continuing from said handle through said head under said well and opening from the head on the opposite side from said handle; a vacuum indicating gauge carried in said well in communication through the bottom thereof with said passageway thereunder; said head having a transverse vertically disposed passageway leading downwardly from said longitudinal passageway intermediate said opposite side opening and said gauge communication thereof; a screen positioned in said longitudinal passageway across said transverse passageway; means seating said screen in the longitudinal passageway and sealing off the outer end thereof; a test seating head projecting from the underside of said first head and having an opening therethrough from said transverse passageway; an elastic seating member carried around the periphery of and extending from the under face of said test head maintaining said face spaced at all times from the surface of the casting being tested; a thumb operable cut-off valve in said handle intercepting said longitudinal passageway; a cover over said head well independent of said gauge; a pressure range marker; said marker being secured to said cover; and means revolubly mounting and retaining said cover on said head providing for circumferential shifting of the marker.

References Cited in the file of this patent
UNITED STATES PATENTS

| 1,652,051 | Rogers | Dec. 6, 1927 |
| 1,933,322 | Fagan | Oct. 31, 1933 |
| 2,383,936 | Hohl | Sept. 4, 1945 |
| 2,457,401 | Rupley | Dec. 28, 1948 |
| 2,593,957 | Aller | Apr. 22, 1952 |
| 2,620,656 | Peterson | Dec. 9, 1952 |
| 2,658,386 | Guichard | Nov. 10, 1953 |

FOREIGN PATENTS

| 277,871 | Great Britain | Sept. 29, 1927 |
| 391,218 | Great Britain | Apr. 24, 1953 |